United States Patent

[11] 3,593,704

| [72] | Inventor | Ardath M. Schwab<br>606 Camino Cerrado, South Pasadena, Calif. 91030 |
|---|---|---|
| [21] | Appl. No. | 689,718 |
| [22] | Filed | Dec. 11, 1967 |
| [45] | Patented | July 20, 1971 |

[54] PULSE SENSOR FOR BODY PULSE RATE MEASURING MEANS
1 Claim, 5 Drawing Figs.

| [52] | U.S. Cl. | 128/2.05, 128/2 |
|---|---|---|
| [51] | Int. Cl. | A61b 5/02 |
| [50] | Field of Search | 128/2, 2.05, 2.06, 2.1 |

[56] References Cited
UNITED STATES PATENTS

| 3,452,744 | 7/1969 | Van Den Nieuwenhet et al. | 128/2.05 |
| 2,439,495 | 4/1948 | Sturm | 128/2.05 |
| 2,769,929 | 11/1956 | Hardway, Jr. | 128/2.05 X |
| 2,918,054 | 12/1959 | Goolkasian | 128/2.05 |
| 3,190,436 | 6/1965 | Diament | 128/2 UX |
| 3,250,126 | 5/1966 | Shapiro | 128/2 UX |
| 3,306,282 | 2/1967 | Pierce | 128/2 |

*Primary Examiner*—William E. Kamm
*Attorney*—Miketta, Glenny, Poms and Smith

ABSTRACT: A measuring apparatus having a housing, an electric meter mounted therein and a temperature sensitive probe removably connected thereto and with an amplifier therein, and a source of electric power associated therewith to generate temperature responsive output signals which are received by the meter to thereby indicate the temperature of the body. A pulse sensitive element is connected to the housing, and the associated source of electric power, which generates pulse responsive output signals which are modified and fed to the meter for indicating the rate of the body's pulse. The electric circuits between the power source, the sensors and he the meter are normally open and easily operated pushbutton switches are provided to temporarily close one or the other circuit when a reading on the meter is to be taken.

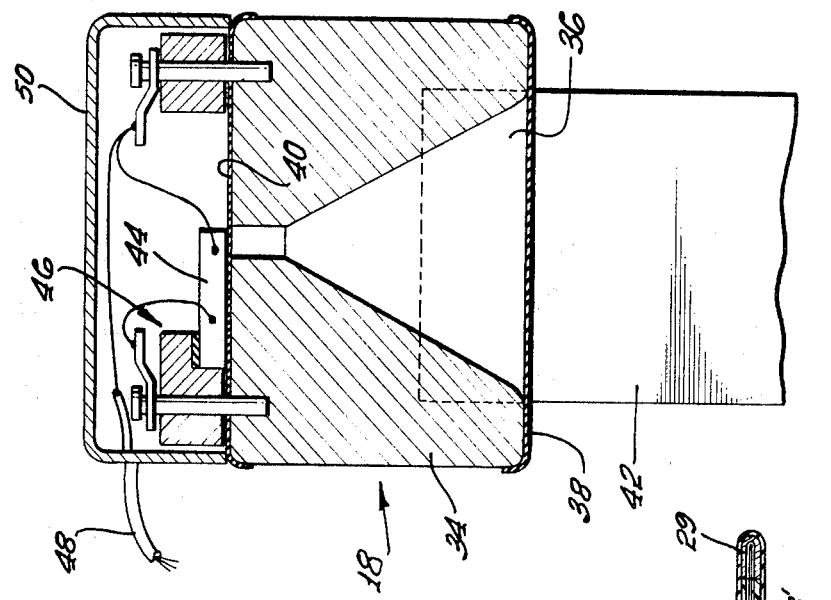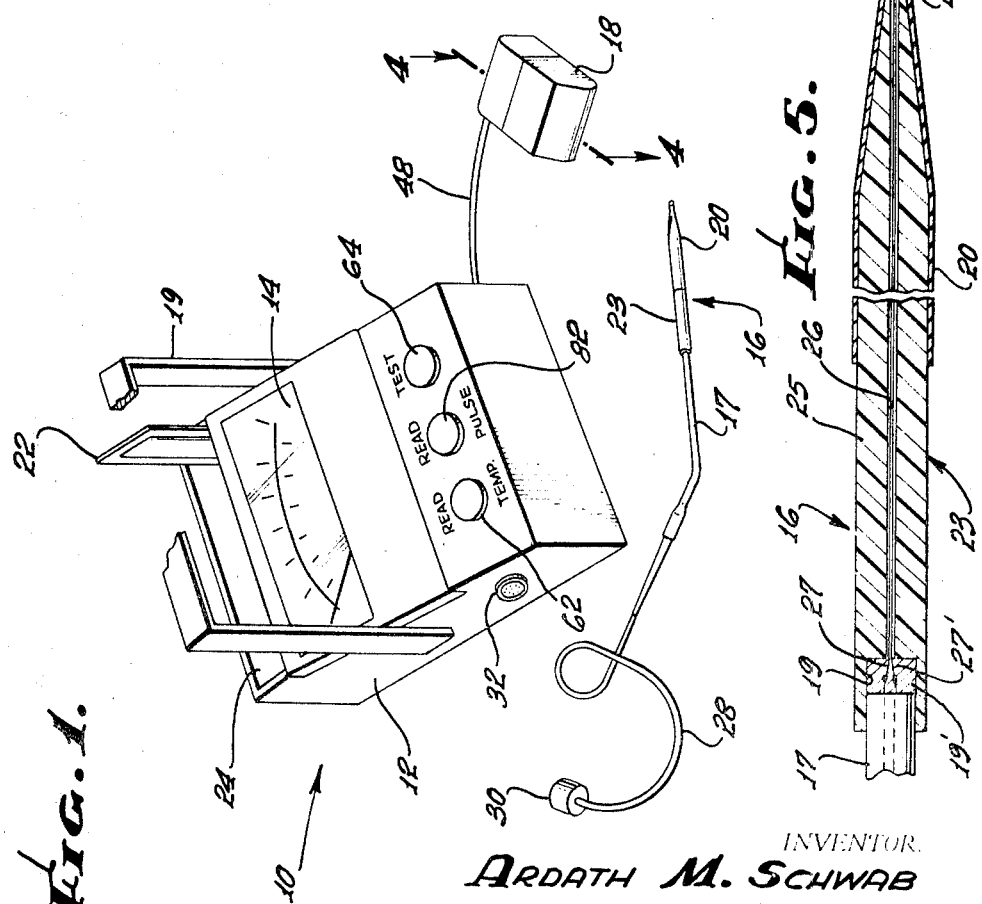

3,593,704

PULSE SENSOR FOR BODY PULSE RATE MEASURING MEANS

BACKGROUND OF THE INVENTION

1. Field of the Invention

This invention relates to apparatus for measuring body conditions and more particularly to apparatus for electrically sensing and indicating body temperature and pulse rate.

2. State of the Prior Art

In the past, temperature of patients has generally been taken with a glass thermometer. This pulse rate was taken manually by feeling the pulses and counting them over a period of time. Both methods are time consuming as well as relatively inaccurate. Particularly hospitals and medical offices, where temperature and pulse rates are taken many times a day skilled personnel expend substantial amounts of time for this task. Notwithstanding the expense of lost time, so far no practical way of reducing the required time has been found.

More recently, electrical instruments were devised for taking both temperature and pulse measurements. They employ sensing devices which are attached to a portion of the human body. The readings are indicated on electrically actuated meters. Temperature measuring devices include probes which have a heat-sensitive element that is placed adjacent to the body's skin or tissue and which, through a conventional bridge circuit, activates the temperature calibrated meter. Although a great number of the disadvantages of the glass thermometers are eliminated, particularly the danger of breaking the glass thermometer and the need for shaking it down after each temperature measurement, these devices have not been fully satisfactory. The electric circuitry of the thermometers does not exhibit the desired high sensitivity as well as the good linearity which is necessary to obtain accurate temperature measurements. Moreover, they require a relatively long warmup period which, when not observed, results in inaccurate temperature readings.

Prior art automatic pulse sensors generally employ photoelectric cells to sense changes in the intensity of light transmitted through a vascular tissue. The light transmission characteristics of such tissue vary with the amount of blood in it and the detection of changes in these characteristics provides an indication of the heart beat from which the pulse rate can be determined. These devices are relatively cumbersome to operate since a light source must be positioned on one side of a portion of the human body and the photoelectric cell on the other. To obtain sufficient light transmission, the portion of the body must have a relatively small cross section. This often makes the application of the pulse sensor to the human body difficult and in, some cases, particularly when the patient is unable to cooperate as when he is unconscious, impossible. In addition, the necessity of having to place the light source and the photoelectric cell at a remote portion of the body, such as a finger for example, the amount of blood flowing through that member is relatively small and the likelihood of missing one or more of the heart beats is substantial. The accuracy of the readings is therefore reduced.

Other methods and devices for measuring pulse rates have been devised, all of which, however, are large, bulky, and stationary. As such, they are not adapted for use in a hospital ward where an operator must take them from bed to bed. They are used in conjunction with medical and psychological testing procedures and therefore do not exhibit the desired portability.

SUMMARY OF THE INVENTION

The present invention provides an apparatus for the measuring of body temperature and pulse conditions. Briefly, it includes a housing adapted to mount a source of electric power, a probe including a temperature sensitive element, a pulse-sensing element, and an electric meter. Means in electric communication with the meter and adapted to be connected to the source are provided for amplifying first signals generated by the temperature sensitive element. A first conductor means projections past the housing and electrically couples the temperature sensitive element with the amplifying means. Means are connected with the meter and adapted to be connected with the source for generating a modified output signal, the average level of which increases with the rate at which the pulse-sensing element generates pulse responsive output signals. A flexible second conductor means projects past the housing and electrically couples the pulse-sensing element with the means for generating the modified output signals. Normally open first and second switching means are provided to selectively couple the source with the amplifying means and the source with the means for generating the modified output signals, respectively.

Preferably, the apparatus includes an electric coupling to enable disconnection of the first conductor means from the amplifying means and the housing. A number of different probes of a particular shape and construction especially adapted for placement at particular portions of the patient's body are also provided. The apparatus moreover includes disposable protective covers which can be placed over the temperature probe to eliminate the need of having to sterilize it after each temperature taking. A multiplicity of such covers are stored in a special pocket of the housing of the apparatus whereby an operator can go from bed to bed and take the temperature of patients continuously.

The amplifying means of the apparatus includes a transistorized and integrated electric circuit to assure maximum sensitivity as well as linearity which results in temperature readings of the highest accuracy. The means for modifying the pulse responsive signals from the pulse sensor are likewise an integrated and transistorized electric circuit to assure the maximum possible responsiveness of the reading with respect to the picked-off signals. Aside from its high accuracy, the apparatus is confined in a space which is substantially less then the space required by prior art instruments for electrically taking temperature and/or pulse readings. This makes the instrument easily portable and reduces its manufacturing costs.

The pulse and the temperature reading components of the apparatus can of course be constructed separately to provide an independent pulse taking apparatus and an independent temperature taking apparatus. The components of the apparatus remain the same except that in that case two housings as well as two electric meters are required.

IN THE DRAWINGS:

FIG. 1 is a perspective view of a preferred exemplary embodiment of an apparatus for measuring body conditions in accordance with the present invention;

FIG. 4 is an elevational view in section of the exemplary embodiment of a pulse sensor means of the apparatus of Fig. 1 taken therein along the plane 4—4; and Fig. 5 is an enlarged detail view of the exemplary embodiment of temperature probe of the apparatus of Fig. 1.

Figure 2:
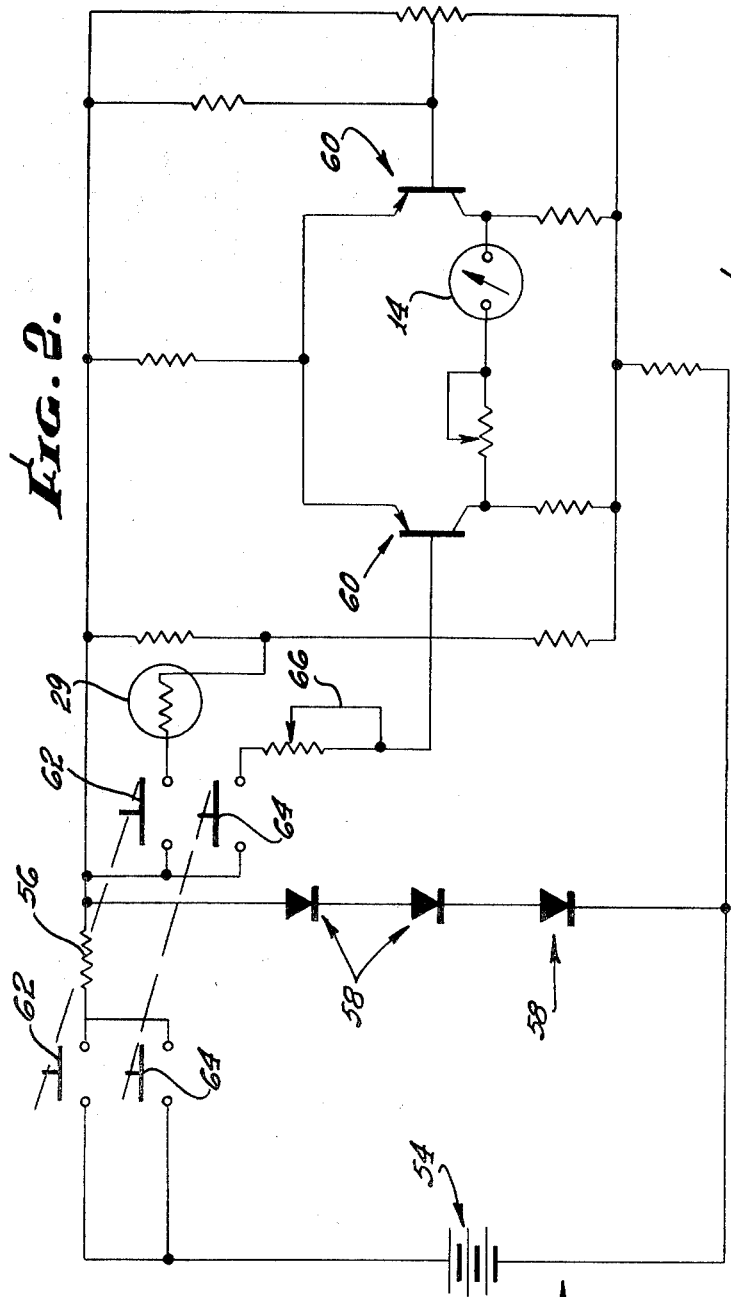
FIG. 2 is a schematic electric wiring diagram of the temperature-sensing circuit of the apparatus of FIG. 1.

Referring first to Fig. 1, the preferred exemplary embodiment of an apparatus for measuring body conditions is shown generally at 10 and includes means for sensing a patient's body temperature and pulse. The apparatus includes, in general, a housing 12, an electric meter 14, a temperature sensitive probe 16 and a pulse sensor 18. A handle 19 for carrying the apparatus is pivotally secured to the housing.

A disposable protective cover 20 is placed over a portion of the probe which comes in contact with the patients body tissue while a temperature reading is taken. The protective covers 20 are preferably constructed of a thin, highly elastic material having a high-tear strength to facilitate their assembly onto (and off of) the probe 16 as seen in Fig. 5. A material particularly well adapted for this use is pure gum latex which has been heretofore employed in medical gloves and finger cots, by way of example. The protective covers 20 are packaged in individual envelopes 22 and the housing 12 is constructed to define a pocket 24 where a multiplicity of envelopes can be stored. An operator using the apparatus has a sufficient supply of covers conveniently stored in the apparatus to enable him to take large numbers of temperature readings without interruptions for cleaning or sterilizing the probes after each use.

The temperature sensitive probes 16 are preferably constructed with a body or base rod 17 of a noncorroding material, such as stainless steel, with a plastic body 23 and heat sensor means 29 on the end thereof, as shown in FIGS. 2 and 5.

The heat sensor means or probe portion 23 which is to be placed in the patient's mouth (or elsewhere) to rapidly sense and produce a temperature reading, according to the present invention, includes a molded plastic (styrene) body 25 with a central bore 26 through which a pair of electrically conductive wires or leads 27 and 27' are passed. A thermistor or thermal resistor with a high-negative temperature coefficient of resistance, as made by sintering mixtures of metallic oxides such as manganese, nickel, cobalt, copper, iron and uranium for example, is formed on the ends of the wires 27 and 27' prior to their assembly to body 25 and is cast within a heat conductive epoxy resin to provide the highly heat-sensitive probe tip 29. Tip 29 preferably has a relatively small diameter on the order of about 0.070" with an end radius of approximately one-half its diameter. The adjacent end 23' of body 23 preferably has the same small diameter to provide a reduced tip and end portion of the probe of approximately one-fourth inch so that heat reservoirs or bodies are reduced to a minimum adjacent the thermistor element cast within tip 29. The free ends of wire 27 and 27' assembled through body 25 are soldered to similar wires or leads in rod 17 and conductor or cable 28. The cavity 19 may be filled with an epoxy resin 19' after such soldering operation. The tapered portion of body 23 is preferably approximately three-fourths inch long and tapers from the full body diameter of about one-fourth inch down to the top diameter of approximately 0.070". Electric conductor 28 secured to the end of the probe 16 is provided with a conventional electric plug 30 which can be inserted in a mating receptacle 32 mounted on a side of the housing 12.

Referring to both FIGS. 1 and 4, the pulse sensor 18 includes a body 34 having a tapered opening 36 and a first membrane 38 adjacent the large end of the tapered opening. A second membrane 40 is secured to the body adjacent the narrow end of the tapered opening. Preferably the membranes are constructed of conventional neoprene rubber. They are secured to the body such that the first membrane 38 is relatively loose and the second membrane 40 is taut.

A suitable armband 42 is secured to sides of the body and includes means for securing free ends of the bands to each other to position the pulse sensor adjacent a main artery of the patients body. A preferred position is the wrist of a patient's because of the ease with which the sensor can be applied thereto.

A conventional transducer 44 is secured to the body against the second membrane 40 by a clamp 46 and is electrically connected with a conductor cable 48 which is of a sufficient length to permit the application of the pulse sensor to the wrist of the patient while the apparatus 10 is placed on a supporting surface such as a table or a nightstand. A top cover 50 is placed over the transducer and the clamp to protect them from becoming contaminated or damaged.

Referring to Fig. 2, a temperature sensing circuit 52 is powered by a mercury battery 54, is fully transistorized and is preferably constructed on a printed circuit board (not shown) to minimize the physical size of the apparatus. A resistor 56 together with diodes 58 establish a constant voltage supply from the battery. Back biased PNP transistors 60 limit the current in the heat sensor 29 and prevent its self-heating. The transistors further act as a high-gain differential amplifier. The selected thermistor must be of the precision grade type and must exhibit a temperature or resistance linearity over the expectable temperature range of human bodies. The range is between about 95° F. and about 107° F. A normally open first switch 62 is connected in series with the heat sensor 29 to prevent any current flow through the circuit unless the switch is closed. When the switch is depressed, current flows through the heat sensor, the amplifier and the meter 14. Preferably, the meter is a temperature calibrated micro ampere meter. The resistance of the heat sensor 29 is a function of the temperature to which it is subjected and the needle of the meter is deflected an amount which is responsive to the temperature of the heat sensor.

A normally open test switch 64 is mounted parallel to the switch 62 and the heat sensor 29 and includes a calibrated potentiometer 66. When closed, the test switch subjects the amplifier to a current controlled by the potentiometer and sensed by the meter 14. The circuit can thereby be tested and a faulty apparatus or battery can be detected.

The meter is calibrated for the normal range of human temperature which is between 95° F. and 107° F. If the heat sensor 29 is subjected to temperature within heat range, a reading can be taken on the meter. The potentiometer 66 is constructed and calibrated such that the amplifier and the meter can be subjected to any current within the range of currents through the heat sensor element when subjected to temperatures between 95° F. and 107° F. A nonconcurrence between the setting of the potentiometer and reading of the meter when the test switch is depressed indicates a misreading and alerts the operator to the fact that the apparatus requires repair or maintenance work. This substantially reduces or eliminates the danger of taking wrong readings.

Figure 3:
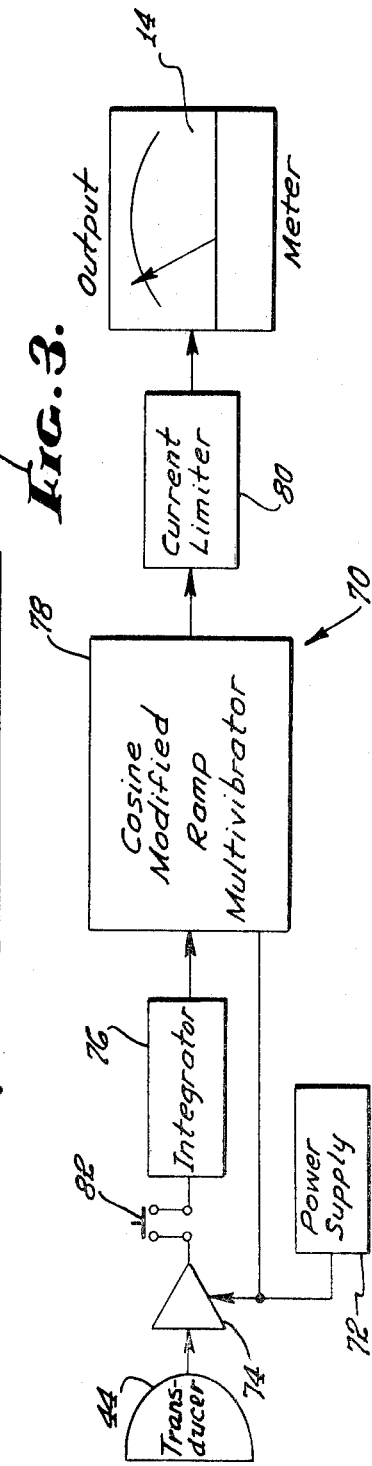
FIG. 3 is a schematic diagram showing the arrangement of the pulse-sensing circuit of the apparatus of Fig. 1.

Referring to Fig. 3, a pulse sensing circuit 70 includes a power supply 72 which may be the same power supply as that used by the temperature sensing circuit 52. If the power supply is the battery 54 of the temperature circuit 52, a Zener diode is employed to supply the required, well regulated voltage. Alternatively, the power supply may be an independent source of constant voltage direct current. In a preferred embodiment of the invention, the pulse sensing circuit uses the same micro ampere meter 14 employed by the temperature sensing circuit. Pulse responsive signals from transducer 44 are received by a preamplifier 74 and, through a conventional integrator 76, are fed into a cosine modified ramp miltivibrator 78. There the amplified output signals from the transducer modified the signals of the multivibrator which have a constant pulse rate irrespective of the pulse rate sensed by the transducer. The average level of the modified vibrator output signals increases linearly in response to an increase in the pulse rate sensed by the transducer. The modified signals are then fed to the micro ampere meter 14 through a conventional current limiter 80.

This circuit permits the meter to follow a rate of change of the patient's pulse within four sensed pulses. Pulse rate changes are therefore picked up almost instantaneously which is particularly helpful and desirable when a patient is in a critical condition or undergoes a major operation. A normally open second switch 82, shown in Fig. 1, interrupts the pulse-sensing circuit 70 and must be depressed to take a pulse rate reading. The dial scale of meter 14 includes a second calibration (not shown) to indicate the rate of pulse sensed by the transducer 44 when the needle is deflected by the modified output signals.

To assure proper reading of the meter when the needle is deflected, it is preferred that the second switch is depressed for a minimum between about five and ten seconds. This enables the operator to visually average his reading since the needle will normally fluctuate to some extent due to irregularities of the patient's pulse rate. The dial scale of the electric meter 14 is preferably provided with a mirror to assure that the operator takes a correct reading. If he takes a reading by observing the needle from an angle other than the vertical to the plane of the dial, he sees a double image of the needle and is warned that his reading might be incorrect.

The apparatus 10 can, of course, be constructed in two parts. A housing is then provided with a temperature calibrated meter and a second housing with a meter calibrated in pulses per minute. The housing includes a temperature probe 16 and a pulse sensor 18, respectively, and each unit is used to measure either the temperature or the pulse of the patient. All details of construction of the units remain the same as that described in conjunction with the preferred embodiment.

Turning to the operation of the apparatus, an operator places it on a suitable support, say a nearby stand adjacent the patient's place, connects a probe 16 to the receptacle 32, and slips a protective cover 20 over the end of the probe which mounts the neat sensor 26. The probe is then placed adjacent the patient's tissue, preferably in the patient's mouth alongside the inner gumline near the tongue root. After permitting the heat sensor to reach body temperature, which on the average takes between about three and 8 seconds, the operator depresses the first switch 62 of the instrument. Immediately upon depression of the switch, the patient's body temperature can be read on the electric meter 14. After the short initial warmup period has elapsed, approximately 5 seconds, the temperature reading on this instrument is accurate within one-tenth degree Fahrenheit of the actual body temperature. This is a substantial improvement over the prior art glass thermometers which required three to 5 minutes to give a temperature reading, the accuracy of which never exceeded plus or minus two-tenths degrees Fahrenheit of the actual body temperature and generally did not exceed three-fourths degrees Fahrenheit.

If a pulse rate reading is to be taken, the operator places pulse sensor 18 adjacent the patient's wrist and secures it thereto with the armbands 42. Immediately thereafter, without a warmup period, the operator depresses the second switch 82 and reads the pulse rate on the dial scale of the electric meter 14. With the above recommended 5 to 10 seconds visual reading to average the fluctuating deflection of the needle, the accuracy of the pulse rate is within 2 percent of the actual pulse rate of the patient.

Periodically, say at the beginning of each day, the operator checks the accuracy of the apparatus by setting the potentiometer 66 at a calibration within the range of the meter 14. If the calibration set on the potentiometer and the readout on the meter correspond, the apparatus functions satisfactorily and it can be used to take temperature. If the two do not correspond, repair or maintenance, such as replacement of the battery 54 or repair of the components of the apparatus, must be performed before the unit can be used to take readings.

Having thus described an exemplary embodiment of the improvement in an apparatus for measuring body conditions according to the present invention, it should be noted and understood by those skilled in the art that other modifications, adaptations and alternative embodiments of the exemplary apparatus may be made within the scope of the present invention which is defined by and limited only by the following claims:

I claim:

In an apparatus for measuring body pulse rate having a sensing means for generating body pulse-responsive electrical signals, the improvement in sensing means comprising the provision of:

a sensor body having an outwardly opening cavity with a large opening and a small opening, a first membrane across the small opening, a second membrane across the large opening, said first membrane being taut and said second membrane being loose, a transducer mounted to the sensor body in operable relationship with the first membrane, and a band for securing the sensor body to a portion of the first mentioned body whereby the pulse of the first mentioned body generates the pulse-responsive signals through the membranes and the transducer.